June 13, 1939.  J. J. JAKOSKY  2,162,086
METHOD AND APPARATUS FOR ELECTRICAL EXPLORATION OF THE SUBSURFACE
Filed Feb. 21, 1938  2 Sheets-Sheet 1
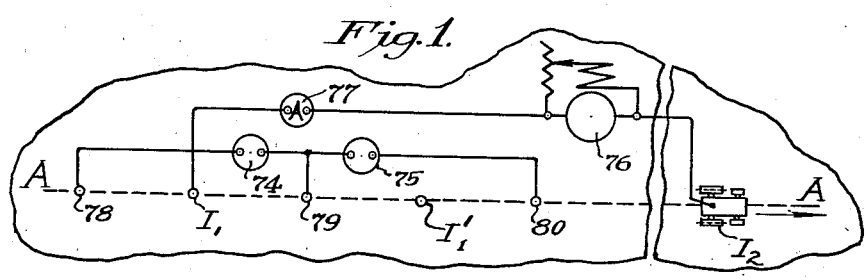
Fig. 1.
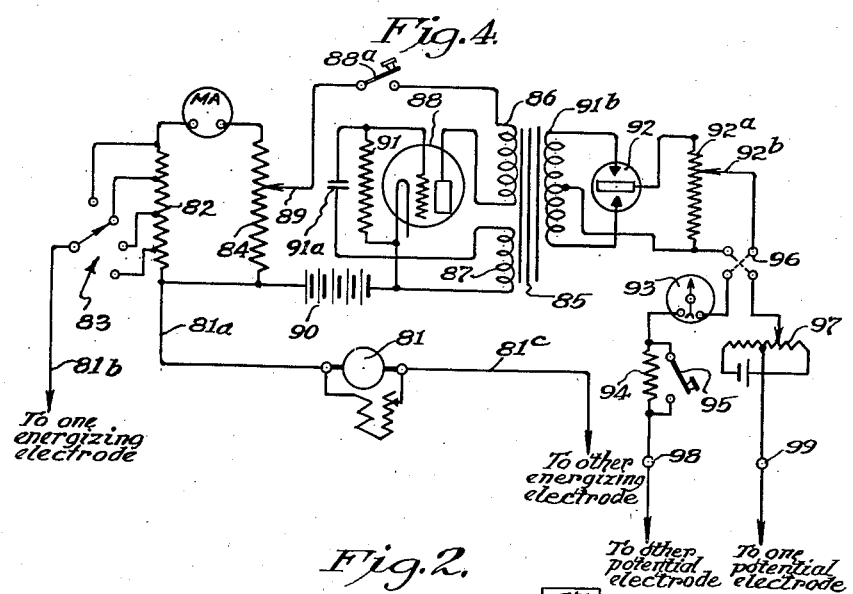
Fig. 4.
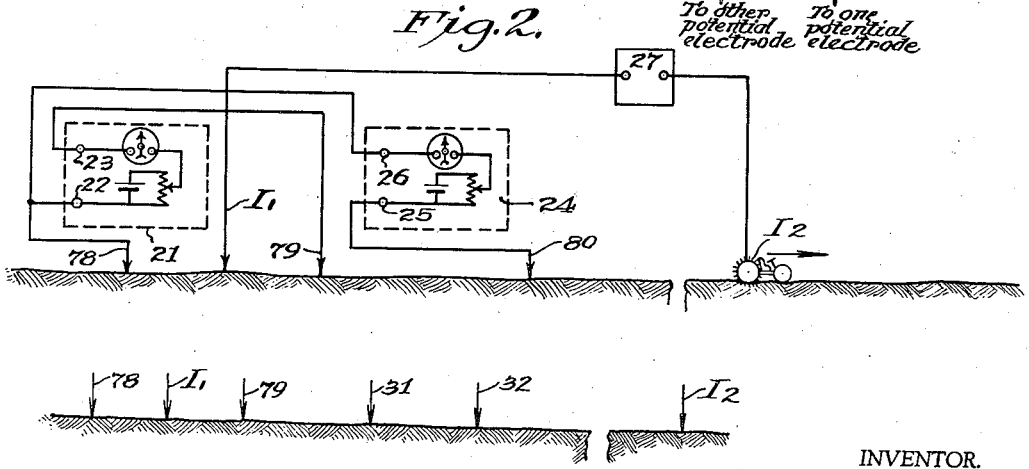
Fig. 2.
Fig. 3.
INVENTOR.
John Jay Jakosky,
BY
ATTORNEYS.

June 13, 1939.  J. J. JAKOSKY  2,162,086
METHOD AND APPARATUS FOR ELECTRICAL EXPLORATION OF THE SUBSURFACE
Filed Feb. 21, 1938  2 Sheets-Sheet 2

INVENTOR.
John Jay Jakosky,
BY
ATTORNEYS.

Patented June 13, 1939

2,162,086

UNITED STATES PATENT OFFICE 2,162,086

METHOD AND APPARATUS FOR ELECTRICAL EXPLORATION OF THE SUBSURFACE

John Jay Jakosky, Los Angeles, Calif.

Application February 21, 1938, Serial No. 191,681
In Canada January 5, 1938

16 Claims. (Cl. 175—182)

This invention relates to a method and apparatus for the electrical exploration of the subsurface and pertains more particularly to a method and apparatus which may be used to eliminate the effects of natural earth potentials in measurements involving the potential created between spaced points on the earth's surface by the passage of an electric current through the earth in the region of such spaced points.

It is well known that natural earth currents flow over rather large areas and produce potentials between spaced points on the earth's surface which fluctuate rapidly and sometimes vary between values which are on the order of magnitude of the artificially created potentials which it is desired to measure between such spaced points. In some cases, the fluctuations in natural earth potential are greater than the variation in the created potential due to variations in the characteristics or structure of the subsurface. Thus, unless careful consideration is given to these natural earth potentials, measurements involving artificially created potentials may be greatly in error.

In order to overcome the effects of these natural earth or ground potentials, methods have been used in which the earth has been energized with alternating current. However, this introduces additional complications in requiring more complex measuring and energizing devices. Also, additional complications are introduced by phase angle errors and the like. In order to overcome some of the difficulties encountered with alternating current, reversing commutator devices have been used and they also require the use of relatively complicated apparatus and procedures.

Although alternating current methods offer certain advantages for minimizing the effects of ground currents, their use precludes taking advantage of the electrolytic effects associated with the flow of a direct or unidirectional current. The latter effects give rise to measured values which are characterized by sharp trend changes, and allow clear correlation of the depth-resistivity curves obtained at each station where a series of measurements may be made. In order to employ the unidirectional current energizing method, it is essential that some means be provided for compensating for the effects of the irregularly varying unidirectional earth currents.

A common manner of eliminating ground potentials from potential measurements has been to take a measurement of ground potential between two spaced points prior to energizing the earth to produce a created potential between said points, and then measuring the combined ground and created potentials or the created potential alone. In the first case the previously measured ground potential is then subtracted from the combined measurements to give the created potential, and in the second case the previously measured ground potential is subtracted electrically through introducing an opposing potential in the measuring circuit. Although measurements may be made in rapid succession, on the order of seconds apart, the natural earth potentials fluctuate rapidly at times so that the value of the ground potential may change considerably in the few seconds between the measurement thereof and the measurement involving the created potential. Thus, in order to obtain corrected values of created potential by taking successive measurements of the earth potential and the created potential, it is necessary for these measurements to be taken in rapid succession, usually more rapidly than they can be taken accurately by an experienced operator.

The principal object of the invention is to provide a method and apparatus for the electrical exploration of subsurface with which simultaneous measurements involving the natural earth and the created potentials may be obtained whereby the measurements involving the created potential may be corrected for the errors due to natural earth potentials.

An important object of the invention is to provide for continuous measurements, over long periods of time, involving the potential resulting from natural earth currents, and involving the potential resulting from the combined action of the natural earth currents and the created potential so that the measurements involving the created potential may be corrected for errors resulting from stray potentials associated with natural earth currents.

Another object of the invention is to provide for the measurement of the relation of the combined created and natural earth potentials to the energizing current and of the relation of the earth potential to the energizing current whereby the relation of the created potential and the energizing current may be obtained, which is free from errors due to stray earth potentials resulting from natural earth currents.

Further objects and advantages of the invention, of which the above are typical, will become apparent as the description proceeds.

According to this invention an electric energizing current is passed through the earth between a pair of spaced energizing electrodes to create a potential difference between a pair of spaced points on the earth's surface. Two separate measurements are made during the flow of said current, one of said measurements involving the combined natural earth and created potentials existing between the pair of spaced points, and the other of said measurements involving the potential difference resultiing substantially wholly from natural earth potentials, between a pair of spaced points which are so located on the earth's surface that the potential difference therebetween is substantially unaffected by the flow of energizing current.

The last-named pair of points may be located at a position in the region undergoing survey which is sufficiently removed from the energizing electrodes so that they are substantially outside the path of flow of the energizing current, or they may be located so that they are substantially equally affected by the energizing current, either at points adjacent or removed from the energizing electrodes. The two measurements are then combined to provide a corrected measurement involving the created potential which is essentially free from errors due to natural earth currents.

The pair of points between which measurements are taken involving the combined created and natural earth potentials and the pair of points between which measurements are taken involving substantially only the natural earth potentials, are so related to one another that the natural earth potentials between the points of each pair are either equal to one another or bear a known relation to one another.

For this purpose the straight line between the two points of one pair should extend in the same direction as the straight line between the two points of the other pair, and the spacing between the points of one pair should be either equal to, or have a known relation to, the spacing between the points of the other pair. For example, the two pairs of points may be located on parallel lines on the earth's surface or on the same straight line, as for example, on the line passing through the energizing electrodes. For the sake of simplicity, one point may be common to each pair of points. Thus in the ensuing description and in the appended claims, it will be understood that statements concerning two pairs of points are meant to include three points in which one point is common to each pair, as well as two separate pairs of points.

It is generally preferable, however, to take measurements involving potentials between two separate pairs of points in order to avoid the effects of the potential drop adjacent a point common to both pairs. If even a small current flows in the potential circuit connected to one of the pairs of points, it will introduce a small potential adjacent the electrode at the common point, and this potential drop will be transmitted to the other potential circuit. Therefore it is advisable to employ two separate potential circuits, one for measurements involving the natural earth potentials alone and one for measurements involving the combined created and natural earth potentials.

The flow of energizing current may then be repeated or continued while varying one or more factors such as the path of current, the magnitude of current, or the time duration of current flow, or the position of one or more of the spaced potential points, in such manner as to produce variations in the created potential indicative of variations or inhomogeneities in the subsurface at different depths or at different positions, and simultaneous measurements involving the natural earth potential and the combined effects of natural earth and created potentials may be made continuously or at intervals as the created potential is so varied. For example, the path of current flow may be varied by successively changing the position of at least one of the energizing electrodes and passing current between said electrodes at each of the successive positions while taking simultaneous measurements as above described for each such position. Thus, two sets of measurements may be obtained, one of which sets of measurements will be primarily indicative of the effects of natural earth potentials in the region and the other of which sets of measurements will be indicative of the combined effects of the natural earth potentials and the created potential. By proper correlation a set of measurements may be obtained which is substantially free from the errors due to natural earth currents.

References herein to the taking of measurement involving potential, or potential difference, are intended to including the direct measurement of the potential difference existing between a pair of spaced points, the direct measurement of the relation between the energizing current and the potential difference existing between a pair of spaced points, or a measurement of the energizing current required to maintain a predetermined potential difference between a pair of spaced points on the earth's surface. In order to obtain the advantages of the electrochemical phenomena associated with the flow of an electric current through the subsurface comprised of a multiplicity of layers of differing electrolytes, I preferably use unidirectional current, either pulsating or continuous, for energizing the earth. The current may be either of constant or variable magnitude and is preferably controlled in a predetermined manner, as, for example, by varying the magnitude of the current in accordance with some function of the spacing between the energizing electrodes.

Apparatus according to this invention, in its preferred form, may comprise a pair of energizing electrodes in electrical contact with the earth at positions spaced from one another, and a source of unidirectional current associated with said electrodes for passing an electric current through the earth therebetween. The apparatus further comprises means responsive to the combined effects of the natural earth potential and the created potential existing between a pair of spaced points on the earth's surface and means responsive substantially wholly to the earth potential existing between a pair of spaced points so located that the potential difference therebetween is substantially unaffected by the energizing current. The apparatus preferably further comprises means for controlling or measuring the magnitude of the current passed through the earth between the energizing electrodes.

More specifically, I prefer to provide a potential responsive means connected to the earth at two spaced points between which a potential is created by the passage of an electric current through the earth between the energizing electrodes, whereby said potential responsive means is subject to the combined effects of the created and natural earth potentials, and another potential responsive means connected to the earth at two spaced points between which there is substantially no potential difference created by the passage of such energizing current, whereby this other potential responsive means is subject, substantially solely, to the natural earth potential in the region undergoing survey. Each of the potential responsive means may comprise a device for measuring, indicating, or continuously recording potential, or may comprise a device forming part of an apparatus such as hereinafter described for measuring or recording the relation between the potential and the energizing current.

The accompanying drawings illustrate schematically typical methods of practicing the present invention, and certain apparatus arrangements according to my invention, and referring thereto:

Fig. 1 is a diagrammatic plan view of an apparatus arrangement according to my invention;

Fig. 2 is a diagrammatic vertical section illustrating a modified apparatus arrangement;

Fig. 3 is a diagrammatic vertical section showing a modified and generally preferable electrode arrangement according in my invention;

Fig. 4 is a wiring diagram of a preferred form of apparatus according to my invention, for taking ratio measurements.

Figure 5:
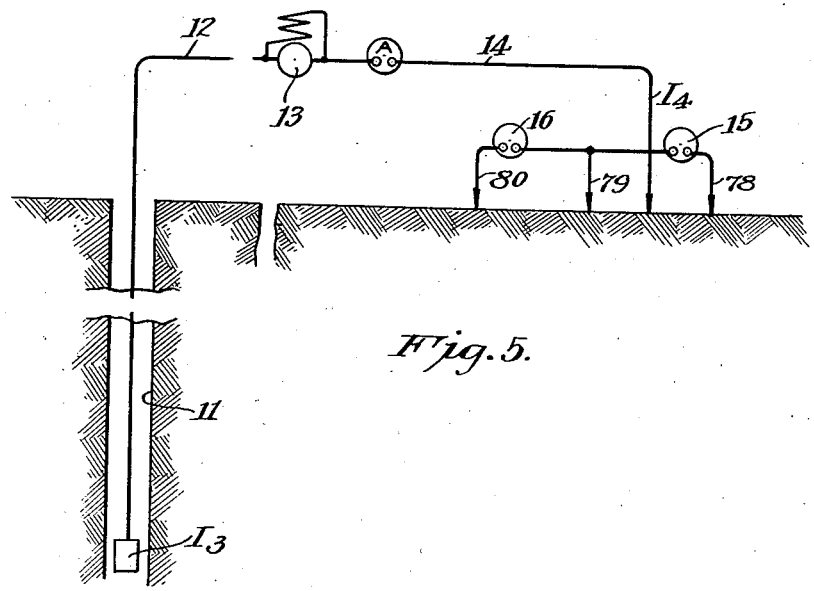
Fig. 5 is a diagrammatic vertical section showing my apparatus as used in bore hole surveying.

Referring to Fig. 1 I have shown an apparatus arrangement which is particularly applicable to the minimization or substantial elimination of measurement errors resulting from natural earth currents. With this arrangement, energizing electrodes are shown at $I_1$ and $I_2$ and are spaced from one another along the earth's surface by a known distance and are connected through suitable conductors to a controllable current source such as a generator 76. An ammeter 77 may be connected in the energizing circuit to measure the energizing current. The electrode $I_1$ is shown as a fixed electrode while the electrode $I_2$ is shown as a mobile electrode device such as shown in my United States Patent 2,105,247, and may be assumed to be moving or as capable of being moved while maintaining continuous electrical contact with the earth's surface, in the direction of the arrow. Potential electrodes are shown connected to the earth on opposite sides of the electrode $I_1$ at 78 and 79 and located substantially on a line A—A passing through the energizing electrodes. A third potential electrode is shown at 80, located on the line A—A and on the side of the electrode 79 toward $I_2$. Measuring instruments 74 and 75, such as indicating or recording potentiometers—which are well known to the art, are shown connected through suitable conductors between the electrodes 78 and 79, and 79 and 80, respectively.

Passage of an electric current through the earth between the electrodes $I_1$ and $I_2$ will create a potential difference at positions on the earth's surface, for example, at the position defined by the electrodes 79 and 80, which are shown as located between the energizing electrodes. By correctly positioning the electrodes 78 and 79, the potential difference created therebetween by the energizing current may be substantially minimized or eliminated, or, stated in different terms, the electrodes 78 and 79 will be equally affected by the energizing current. For practical purposes this may be accomplished by spacing the electrodes 78 and 79 at two points on the equipotential circle or line surrounding the electrode $I_1$, and spaced in opposite directions from the electrode $I_1$ along the line A—A or along a line parallel thereto.

In order to simplify the consideration of the factors involved, let us assume that there are no ground currents flowing in the region containing the electrodes $I_1$ and $I_2$ in which event all points in the region will be at the same potential. Upon passing an electric current through the earth between the electrodes $I_1$ and $I_2$ an electric or potential field will be created and there will be lines of equal potential which may be drawn along the earth's surface. On opposite sides of one of the electrodes, $I_1$ for example, and substantially on the line passing through the electrodes, there will be two points such as 78 and 79 which lie on the same equipotential line, so that when a measuring instrument is connected to these points no potential will be indicated. At relatively small distances (less than 10% of the total separation between the power electrodes $I_1$ and $I_2$) these points may be considered as being spaced equidistant from one of the energizing electrodes and even though under such conditions there may be some potential existing between such points, it will be negligible. If now an earth current is flowing in the region under consideration there will be a second potential field superposed upon the created potential field so that there may be a difference in potential between the pair of points such as 78 and 79 above referred to. Other points such as the points 79 and 80, in the potential field, will also have an extra potential difference due to the natural earth current and the relative effect at the two positions will be in accordance with known considerations, for example, in accordance with the distances between the electrodes 78 and 79, and 79 and 80 with the arrangement shown.

As an example of the manner of locating a pair of points, such as the points 78 and 79, whose potential difference is substantially unaffected by the energizing current and whose potential difference is due substantially wholly to natural earth potentials, I may proceed as follows:

The point 79 may be arbitrarily located at a convenient distance from the electrode $I_1$, and the point 78 may be temporarily located at an equal distance therefrom on the opposite side thereof. The earth is then intermittently energized by intermittently applying current between the electrodes $I_1$ and $I_2$ and the instrument 74 is observed to see if the energizing current produces an effect thereon. If such is the case, the point 78 is shifted to new positions along the line A—A until a position is found where the energizing current has no appreciable effect on the indications of the instrument 74. It may be necessary, if the electrode $I_2$ is moved for a considerable distance, to relocate the point 78 or 79, since the created potential field will shift and the energizing current will produce an appreciable potential difference between the points 78 and 79. This relocating may be done in the manner above described and will usually require moving the location of one of the points a few feet.

Natural earth currents are regional in character and may be considered as flowing in substantially straight lines over rather large areas, so that if the distance between the electrodes 78 and 79 is equal to the distance between the electrodes 79 and 80, the potential differences or variations produced therebetween by the natural earth currents will be substantially equal. Thus, as the position of the electrode $I_2$ is successively changed, as by moving said electrode along the line A—A, and the current is passed between the electrodes I₁ and I₂ at each of the successive positions to successively vary the path of the current, measurements obtained between the electrodes 78 and 79 for each current path will be primarily indicative of the difference in natural earth potentials existing between these electrodes, while the potential difference as measured between the electrodes 79 and 80 for each of the current paths, will be indicative of the difference in potential due to natural earth currents and of variations in the value of the created potential difference as affected by variations in the subsurface. By subtracting the measurements obtained between 78 and 79 from the measurements obtained between 79 and 80 for each of the successive current paths, the resulting differences will be substantially free from the effects due to natural earth currents and will yield a corrected series of measurements of the created potential for each of the respective current paths.

Measurements involving the differences in potential at the two positions of measurement defined by the electrodes 78, 79, and 80 may be continued as the electrode I₂ moves outwardly along the line A—A from some initial to some final value of separation. If desired, additional measurements may be taken while the electrode I₂ is moving along the line A—A in the opposite direction and on the opposite side of the electrode I₁. In such a case it is preferable to shift the position of the electrode I₁ to the position indicated at I'₁ which lies on the line A—A substantially midway between the electrodes 79 and 80. This arrangement would then correspond to the arrangement shown with the electrode I₂ moving to the right of the electrode I₁, the electrodes on the opposite sides of the stationary energizing electrode being affected primarily by natural earth potentials, and the electrodes between the energizing electrodes being affected by both the earth potentials and the created potential. The purpose of shifting the electrode I₁ to the position indicated at I'₁ is to obtain an overlapping in the area through which current flows, thereby obtaining information regarding electrical properties of the strata with current flowing first in one direction and then in the other.

Referring to Fig. 2 a modified apparatus arrangement is shown. With this arrangement a potentiometer is shown at 21 with its terminals 22 and 23 connected to the electrodes 78 and 79 respectively so as to be responsive to the natural earth potentials existing between the electrodes 78 and 79, the potential difference between these electrodes being substantially unaffected by the electric field produced by the current flowing between the electrodes I₁ and I₂. In this respect the function of the potentiometer 21 corresponds to the function of instrument 74 in Fig. 1. A source of electric current 27 is shown connected to electrodes I₁ and I₂ and may comprise a direct current generator, a battery, or a source of direct current pulses, or of low frequency commutated direct current or of alternating current. A second potential responsive device is shown as comprising a potentiometer 24 whose terminals 25 and 26 are connected to the electrodes 78 and 80 respectively. The device 24 is responsive to the potential difference resulting from the natural earth potential between the electrodes 78 and 80 and also resulting from the electric field produced by the flow of current between the electrodes I₁ and I₂. As far as the potential difference due to the electric field is concerned, the difference in potential between the electrodes 78 and 80 is substantially the same as the difference in potential between the electrodes 79 and 80. However, the potential difference due to natural earth potentials between the electrodes 78 and 79 and between the electrodes 78 and 80 will be in accordance with the spacing between the respective electrodes of each pair so that the corrective potentials as indicated by the potentiometer 21 will have to be multiplied by a factor which depends upon the relative spacing of the two pairs of electrodes, two in this case, in order to apply this correction to the reading obtained on the potentiometer 24 as will be apparent to one skilled in the art.

Referring to Fig. 3, I have shown an electrode arrangement in which the measurement involving the created and the natural earth potentials are made between one pair of electrodes designated as 31 and 32 which may be located between the energizing electrodes I₁ and I₂, and in which the measurements involving the natural earth potential alone are made as before between the electrodes 78 and 79 which are located on opposite sides and substantially at equal distances from one of the energizing electrodes. The two potential responsive devices such as 74 and 75, or 21 and 24, may be connected between the pairs of electrodes 78 and 79, and 31 and 32, respectively. It is generally preferable to use two separate sets of electrodes as shown in Fig. 3, rather than to use a common electrode as shown in Figs. 1 and 2, since a flow of current in either one of the measuring circuits will have little or no effect on the other measuring circuit. When using the arrangement shown in Fig. 1, for example, a flow of current through the electrode 79 while balancing the instrument 74 may affect the balance of the instrument 75, due to the high potential drop produced by the flow of current through the earth adjacent the electrode 79. It is to be noted that it is within the contemplation of this invention to take measurements involving the combined created and earth potentials between points which are located between the energizing electrodes, located outside the energizing electrodes, or between points located on opposite sides of an energizing electrode, as well as between points laterally removed from the line passing through the electrodes.

Numerous procedures may be followed with the apparatus shown in Figs. 1 to 3. For example, the current passed through the earth between the electrodes I₁ and I₂ may be maintained constant or the value thereof may be measured at each of the positions of the electrodes I₁ and I₂ or the current may be varied in a predetermined manner in accordance with separation between the electrodes I₁ and I₂ or the current may be varied or kept constant over extended periods of time while maintaining the energizing electrodes in a fixed position so as to take a series of measurements of both the natural earth and combined natural earth and created potentials to determine variations in the created potential resulting from the time and magnitude of current flow. In each of the above cases two series of measurements involving potential are taken, a series of measurements involving natural earth potential alone and a second series of measurements involving combined effects of the natural earth and created potentials. It is also possible to practice my invention by maintaining a predetermined value of potential between the electrodes which are influenced both by the natural earth and the created potentials and to record the successive values of current required to give the predetermined potential, while also taking measurements of natural earth potential alone.

According to a preferred procedure, I provide means for directly measuring the relation between the current in the energizing circuit and the potential between a pair of potential electrodes, while the current is maintained approximately constant or is varied in any manner. Such measurements may be obtained with an apparatus in which the potential and energizing circuits are electrically and electrostatically isolated from one another.

An apparatus of the type above described is illustrated in Fig. 4. The energizing current from a source of current 81 passes through a conductor 81a and through a resistor 82 having a variable tap switch 83 for various ranges of current value and then to one energizing electrode through a conductor 81b. A conductor 81c connects the other side of the source of current 81 to the other energizing electrode. The oscillatory circuit comprises a transformer 85 provided with plate and grid windings 86 and 87 disposed in inductive relation to one another, and an electron discharge device 88 such as a vacuum triode. The plate cathode circuit of the discharge device 88 comprises the plate winding 86, the movable arm 89 of a potentiometer 84, and a source of plate potential 90. The grid circuit comprises the grid winding 87 and a grid-leak and condenser indicated at 91 and 91a. Oscillations may be initiated by closing a key 88a in the plate cathode circuit. It may be seen that the potentiometer 84 is included in the plate cathode circuit of the discharge device so that the amplitude of oscillation of the oscillatory circuit will be either increased or decreased with increasing or decreasing voltages across the potentiometer 84. The transformer 85 is provided with a third or output winding 91b, which is connected to a rectifier 92, and a potentiometer 92a is connected across the output of the rectifier 92. A reversing potentiometer 97 is connected between a variable tap 92b on the potentiometer 92a and a terminal 99 which may be connected to one potential electrode. Another terminal 98, which may be connected to the other potential electrode, is connected to the other side of the potentiometer 92a through a series circuit including a null point galvanometer 93 and a circuit protecting resistor 94 provided with a shunt key 95. A reversing switch is provided at 96 to reverse the polarity of the rectified output. The reversing potentiometer 97 serves to neutralize the rectified potential created across the resistor 92a by the oscillation of the discharge device at zero current flow in the energizing circuit, since it is not practical to have the tube circuit adjusted for zero amplitude at zero current flow. The circuit is therefore adjusted for low amplitude oscillations at zero energizing current flow, and the potential created by these low amplitude oscillations is neutralized by the potentiometer 97.

By use of proper circuit constants, well known to the art, a substantially linear relationship may be obtained between the additional potential applied to the plate of the discharge device by the voltage drop across the potentiometer 84, and the rectified potential created across the terminals 98 and 99. With such linear relationship, the variations in current in the energizing circuit will introduce a compensating variation in the rectified potential impressed across the terminals 98 and 99. The apparatus may then be used for measuring the relation of the potential difference existing between a pair of potential electrodes to the value of the energizing current, by noting the position of the movable arm 89 of the potentiometer 84 required to give a null reading of the galvanometer 93. The apparatus above described and shown in Fig. 4 is disclosed and claimed in my copending application Serial No. 172,009, filed October 30, 1937.

The method of obtaining measurements which are substantially free from errors due to natural earth currents is not necessarily limited to the direct measurements of potential as given by the instruments 81 and 82, but may also be employed with measurements involving the potential differences between the electrodes 78 and 79, and 79 and 80, as for example, with potential ratio measurements when utilizing the apparatus shown in Fig. 4. Thus the electrodes 79 and 80 may be connected to the terminals 98 and 99 and the series resistor 82 may be placed in series with the energizing circuit for electrodes $I_1$ and $I_2$ as above described. A second ratio measuring apparatus may then have its potential terminals connected between the electrodes 78 and 79 and its series resistor placed in series with the energizing circuit for the electrodes $I_1$ and $I_2$.

Under such conditions the ratio as obtained by the instrument connected to the electrodes 78 and 79 will be primarily indicative of the ratio of the energizing current to the ground potential while the indications produced by the instruments connected to the electrodes 79 and 80 will be indicative of the ratio of the energizing current to the algebraic sum of the created and earth potentials. By proper correlative treatment, as will be apparent to those skilled in the art, the two measurements obtained at each of the successive positions of the energizing electrodes may be combined to form a single ratio of energizing current and created potential which is substantially free from errors due to natural earth currents.

The apparatus shown in Fig. 4 may be used to replace the potentiometers 21 and 24 in Fig. 2, in which case two ratio devices, as with Fig. 1, are used. One device has its terminals 98 and 99 connected in place of the terminals 22 and 23 and the other ratio device has its terminals 98 and 99 connected in place of the terminals 25 and 26. The resistors 82 of each of the ratio devices are connected in series with the energizing current between the electrodes $I_1$ and $I_2$.

When using the ratio devices with the electrode arrangement shown in Fig. 3, the terminals of one device may be connected to the electrodes 78 and 79 and the terminals of the other device may be connected to the electrodes 31 and 32.

The arrangements shown in Figs. 1 to 3 are not necessarily limited to the employment of a mobile electrode device, and substantial advantages may be obtained with the arrangements shown while using a common stake electrode as the electrode $I_2$. It is also to be noted that advantages other than the minimization or elimination of earth potentials are realized from the arrangements shown. For example, the use of fixed potential electrodes will, in general, minimize and substantially eliminate the errors due to near-surface effects, since all measurements obtained will be affected substantially equally by the near surface in the neighborhood of the fixed potential electrodes, and variations in the plotted data will result primarily from the effects of the deeper lying structure of economic importance. The advantages of a fixed energizing electrode and of fixed potential electrodes are fully brought out in my copending application Serial No. 172,009, filed October 30, 1937.

The method of this invention is not limited to surveys employing an energizing electrode which is moved along the surface of the earth but may be employed with bore hole surveying in which event the electrode $I_2$ of Figs. 1 to 3 is moved to different depths in a bore hole and measurements are taken after the manner described in relation to a moving surface electrode.

For example, referring to Fig. 5, a movable electrode $I_3$ is shown located in a bore-hole 11 and connected through insulated conductor 12 to a source of current 13 which is connected through insulated conductor 14 to an electrode $I_4$ in contact with the earth at a position laterally spaced from the bore-hole. Potential electrodes 78 and 79 are shown positioned on opposite sides of electrode $I_4$ in such manner that the potential difference therebetween results substantially wholly from natural earth potential and that the potential difference is substantially unaffected by the flow of current between $I_3$ and $I_4$. A third potential electrode 80 is shown positioned so that the potential difference between said electrode and electrode 79 results from the combined effect of natural earth potential and potential created by the energizing current and so that the natural earth potential between electrodes 79 and 80 bears a fixed relation to the natural earth potential between electrodes 78 and 79. Potential-responsive measuring means 15 and 16 are connected between electrodes 78 and 79 and 79 and 80 respectively. Measurements may be taken with the electrode $I_3$ located at different depths in the bore-hole. Separate pairs of potential electrodes as shown in Fig. 3 may be employed in place of the three potential electrodes shown in Fig. 5.

The moving bore-hole electrode may be of any type, for example, it may comprise a drilling apparatus described in my copending applications Serial Nos. 112,207 and 129,839, filed November 23, 1936, and March 9, 1937.

It will also be appreciated that my invention is not limited to the employment of a fixed energizing electrode, or to two fixed energizing electrodes, or to the employment of fixed potential electrodes and that both the potential electrodes and the energizing electrodes may be moved successively to different positions on the earth's surface to obtain successive measurements, while maintaining the same or different spacings between energizing electrodes and between the respective potential electrodes of each pair, the only limitation being that one series of measurements is taken involving the potential difference between a pair of potential electrodes which are so located that the potential difference therebetween is substantially unaffected by the energizing current and is due substantially to the natural earth currents in the region and that the other series of measurements is taken involving the potential difference between a pair of potential electrodes whose potential difference is due both to the energizing current and to the natural earth currents in the same region.

It is further appreciated that this invention is not limited to the specific electrode arrangements herein shown and described, nor to the examples of procedures delineated, but rather to the scope of the appended claims.

I claim:

1. In a method of electrical exploration of the subsurface in which a measurement is taken involving the potential difference created between two spaced points by the flow of an energizing current through the earth, the step which comprises taking a separate measurement, during the flow of the energizing current, involving the natural earth potential between two spaced points which are so positioned with respect to the path of said current that the potential difference therebetween is substantially unaffected by said current, whereby the two measurements may be correlated to give a corrected measurement involving the created potential difference which is substantially free from errors due to natural earth potential.

2. In a method of electrical exploration of the subsurface in which a series of measurements are taken involving the potential difference created between spaced points on the earth's surface by the flow of an energizing current through the earth and in which the successive measurements are influenced by inhomogeneities in the subsurface, the steps which comprise taking another series of measurements, substantially concurrently with the respective measurements of the first series, involving the natural earth potential between spaced points on the earth's surface which are so positioned with respect to the path of flow of the energizing current that the potential difference therebetween is substantially unaffected by said current, whereby the two series of measurements so obtained may be correlated to give a corrected series of measurements involving the created potential difference which are substantially free from errors due to variations in natural earth potential.

3. A method of electrical exploration of the subsurface which comprises: passing an electric current through the earth to create a potential difference between two spaced points; taking a measurement involving the combined effects of said created potential difference and the natural earth potential between said points; and taking another measurement involving the natural earth potential between two spaced points which are so positioned that the potential difference therebetween is substantially unaffected by said current and that the natural earth potential therebetween has a known relation to the natural earth potential between the first-mentioned two points.

4. A method of electrical exploration of the subsurface which comprises: passing an electric current through the earth between two spaced electrodes while taking two series of successive measurements, one of said series of measurements being indicative of the combined effects of variations in the potential difference created by the flow of said current, due to subsurface inhomogeneities, and of variations in natural earth potential in the region being explored, and the other of said series of measurements being substantially solely indicative of variations in natural earth potential in said region.

5. The method of electrical exploration of the subsurface, which comprises: passing an electric current through the earth between a pair of spaced energizing electrodes to create a potential difference between a pair of spaced points on the earth's surface located substantially on a single straight line passing through said energizing electrodes; taking a measurement involving the combined effects of said created potential difference and the natural earth potential between said points; and taking another measurement involving the natural earth potential between a pair of spaced points located substantially on said straight line and on opposite sides of one of said energizing electrodes in such positions that the potential difference therebetween is substantially unaffected by said current and that the natural earth potential therebetween has a known relation to the natural earth potential between the first-mentioned pair of points.

6. The method set forth in claim 5, in which said first-mentioned points are located between said energizing electrodes and the points of one pair are space separated from the points of the other pair.

7. The method set forth in claim 5, in which said first-mentioned points are located between said energizing electrodes and each pair of points has one point in common with the other pair.

8. An apparatus for use in the electrical exploration of the subsurface, which comprises: an energizing circuit for creating a potential difference between a pair of spaced points on the earth's surface, including a pair of spaced-apart energizing electrodes and means for passing an electric current through the earth therebetween; means responsive to the combined effects of said created potential difference and the natural earth potential between said points; and measuring means responsive to the natural earth potential between a pair of spaced points which are so positioned that the potential difference therebetween is substantially unaffected by said current and that the natural earth potential therebetween has a known relation to the natural earth potential between the first-mentioned pair of points.

9. An apparatus as set forth in claim 8, in which the straight line between the two points of one pair extends in substantially the same direction as the straight line between the two points of the other pair.

10. An apparatus as set forth in claim 8, in which all of said points are located substantially on a single straight line passing through said energizing electrodes and said last-mentioned pair of points are located at opposite sides of one of said energizing electrodes.

11. An apparatus as set forth in claim 8, in which the points of said first-mentioned pair of points are space separated from the points of said last-mentioned pair of points.

12. An apparatus as set forth in claim 8, in which each pair of points has one point in common with the other pair.

13. An apparatus for use in the electrical exploration of the subsurface, which comprises: an energizing circuit for creating a potential difference between a pair of spaced points on the earth's surface, including a pair of spaced-apart energizing electrodes and means for passing an electric current through the earth therebetween; means for measuring the relation between said current and the combined effects of said created potential and the natural earth potential between said points; and means for measuring the relation between said current and the natural earth potential between a pair of spaced points which are so positioned that the potential difference therebetween is substantially unaffected by said current and that the natural earth potential therebetween has a known relation to the natural earth potential between the first-mentioned pair of points.

14. An apparatus for use in the electrical exploration of the subsurface, which comprises: an energizing circuit for creating a potential difference between a pair of spaced points on the earth's surface, including a pair of spaced-apart energizing electrodes and means for passing an electric current through the earth therebetween; means for measuring the combined created potential difference and the natural earth potential between said points; and means for measuring the natural earth potential between a pair of spaced points which are so positioned that the potential difference therebetween is substantially unaffected by said current and that the natural earth potential therebetween has a known relation to the natural earth potential between the first-mentioned pair of points.

15. In an apparatus for use in the electrical exploration of the subsurface in a region carrying stray earth currents, the combination of a measuring means responsive to natural earth potentials existing between spaced points in the region and substantially non-responsive to potentials created artificially in said region, and a second measuring means responsive to both the artificially created potential and the natural earth potentials existing between a pair of spaced points.

16. An apparatus for use in the electrical exploration of the subsurface, which comprises: a pair of energizing electrodes in electrical contact with the earth at positions spaced from one another; a source of unidirectional electric current associated with said electrodes for passing an electric current through the earth therebetween; potential responsive means connected to the earth at two spaced points between which a potential is created by the passage of said current through the earth between said energizing electrodes and responsive to the combined created and natural earth potentials; and another potential responsive means connected to the earth at two spaced points between which there is substantially no potential difference created by the passage of such energizing current and substantially solely responsive to the natural earth potential in the region undergoing survey.

JOHN JAY JAKOSKY.